(12) United States Patent
van Schoor et al.

(10) Patent No.: US 6,550,341 B2
(45) Date of Patent: Apr. 22, 2003

(54) METHOD AND DEVICE FOR MEASURING STRAIN USING SHAPE MEMORY ALLOY MATERIALS

(75) Inventors: Marthinus Cornelius van Schoor, Medford, MA (US); Attila Lengyel, Cambridge, MA (US); Gert Johannes Muller, Norwood, MA (US); Andries Jacobus du Plessis, Arlington, MA (US)

(73) Assignee: Mide Technology Corporation, Medford, MA (US)

( * ) Notice: Subject to any disclaimer, the term of this patent is extended or adjusted under 35 U.S.C. 154(b) by 0 days.

(21) Appl. No.: 09/916,661

(22) Filed: Jul. 27, 2001

(65) Prior Publication Data

US 2003/0056599 A1 Mar. 27, 2003

(51) Int. Cl.$^7$ .................................................. G01B 7/16
(52) U.S. Cl. ............................................ 73/775; 73/775
(58) Field of Search .................... 604/281, 95; 219/201, 219/549; 73/777, 775, 779; 337/140; 369/126

(56) References Cited

U.S. PATENT DOCUMENTS

| | | | |
|---|---|---|---|
| 3,620,212 A | 11/1971 | Fannon et al. ............... 128/130 |
| 4,579,006 A * | 4/1986 | Hosoda et al. ......... 73/862.381 |
| 4,680,858 A | 7/1987 | Johnson ................... 29/610 SG |
| 4,905,765 A * | 3/1990 | Hein .............................. 169/61 |
| 4,930,494 A * | 6/1990 | Takehana et al. ............ 600/145 |
| 5,061,914 A * | 10/1991 | Busch et al. ................. 337/140 |
| 5,106,540 A | 4/1992 | Barma et al. ................ 252/511 |
| 5,275,885 A | 1/1994 | Ogura ......................... 428/383 |
| 5,405,337 A * | 4/1995 | Maynard ..................... 604/281 |
| 5,686,003 A * | 11/1997 | Ingram et al. ............... 219/201 |
| 5,938,623 A | 8/1999 | Quiachon et al. ........... 600/585 |
| 6,084,849 A * | 7/2000 | Durig et al. ................. 369/126 |
| 6,164,339 A | 12/2000 | Greenhalgh ................. 139/1 R |

\* cited by examiner

*Primary Examiner*—Max Noori
(74) *Attorney, Agent, or Firm*—George W. Neuner; Steven M. Jensen; Edwards & Angell, LLP

(57) ABSTRACT

An article and method for measuring strain using a strain gauge made of a shape memory y alloy, and preferably a pseudoelastic alloy, is disclosed. The strain gauge includes an element that preferably is attached to a substrate and mounted on an object, or is woven or stitched to a fabric to measure the strain experienced under an applied stress. The preferred pseudoelastic alloy is Nitinol, which in pseudoelastic form can elongate by up to approximately 8% to accommodate strain in an object or fabric. When woven into a fabric, a Nitinol-based strain gauge can measure strains of up to approximately 20% in the fabric. The strain gauge can be used in such applications as automotive and aircraft seatbelts, parachute canopies and static lines, and commercial cargo nets.

30 Claims, 5 Drawing Sheets

METHOD AND DEVICE FOR MEASURING STRAIN USING SHAPE MEMORY ALLOY MATERIALS

FIELD OF INVENTION

The present invention relates to strain sensors and methods for measuring strain and, more particularly, to the use of shape memory alloys for measuring large strains in objects and to devices containing shape memory alloys for monitoring strain in the devices.

BACKGROUND OF THE INVENTION

Shape memory alloys (SMAs) are metal alloy materials that have the ability to return to their original shape after being deformed. All SMAs have two distinct crystal structures, or phases, with the phase present being dependent on the temperature and the amount of stress applied to the SMA. The two phases are martensite, which exists at lower temperatures, and austenite at higher temperatures. The exact structure of these two phases depends on the type of SMA, where the most commonly used type is called Nitinol. Nitinol is a mixture of two component metals, nickel (Ni) and titanium (Ti), which are mixed in an approximate ratio of 55% by weight Ni and 45% by weight Ti, and annealed to form a part in the desired shape.

Shape memory alloys possess two material properties that work together to provide shape memory. The first material property is an austenite to martensite transition in the SMA. This is a solid-to-solid phase transition from an austenite phase with high symmetry (such as a cubic molecular structure) to a martensite phase with lower symmetry (such as tetragonal or monoclinic structures). The second property of a shape memory alloy is the ability of the low-symmetry martensite structure to be deformed by twin boundary motion. A twin boundary is a plane of mirror symmetry in the material. If the twin boundary is mobile, as in certain martensite structures, the motion of the boundary can cause the crystal to rearrange and thus accommodate strain.

Pseudoelasticity (also known as superelasticity) uses the same deformation mechanisms as shape memory, but occurs without a change in temperature. Instead, the transformation is induced by stress alone. Applied stress can overcome the natural driving force which keeps the material at equilibrium in the austenite phase. By applying stress to the material, it can be converted into the martensite phase, and the crystal structure will strain to accommodate the applied stress. When this stress-energy is greater than the chemical driving force of stabilization in the austenite phase, the material will transform to the martensite phase and be subject to a large amount of strain. When the stress is removed, the material returns to its original shape in the austenite phase, since martensite cannot exist above the transition temperature. This superelastic behavior is fully reversible and does not require any change in temperature.

Electrical-type strain gauges are typically used for measuring strain. One common type is a resistance strain gauge, which measures an elongation of an object experiencing a mechanical load. The resistance of an electrically conductive strain gauge material is proportional to the elongation caused by an elastic deformation of the material. The measured change of resistance is converted to an absolute voltage by a wheatstone bridge circuit, and the resulting voltage is linearly related to strain by a constant known as a gauge factor.

SUMMARY OF THE INVENTION

A strain sensor/gauge made of a shape memory alloy material, preferably a pseudoelastic alloy material, and a method for measuring strain is disclosed. A preferred pseudoelastic alloy is Nitinol, which exhibits a measurable change of resistance when strained. A strain gauge can be constructed with an element made of the pseudoelastic alloy mounted on a substrate, which is capable of elongating to accommodate the elongation of the pseudoelastic alloy. Preferably a strain gauge comprising a Nitinol element is mounted on a substrate, which is mounted on an object to measure strain in the object. Preferred substrates include high temperature, high performance thermoplastics such as PEEK, PEI, and PPS; and lower temperature, lower melt viscosity thermoplastics like Grilamid and Kraton materials.

In another preferred form of a strain gauge according to the present invention, the strain gauge comprises an element made of a pseudoelastic alloy which can be stitched or woven into a web of material (such as a fabric) for measuring strain in the web. In such a strain gauge, the pseudoelastic alloy can strain up to approximately 8% of its length without permanent deformation. When stitched to a fabric, the strain gauge element can measure strains of up to approximately 8% in the fabric. When an element (e.g. a filament) of pseudoelastic material is woven into fabric, the strain gauge comprising that filament can measure strains of up to approximately 30% in the fabric.

The method and article of the present invention is particularly useful for measuring strains in webs of material subject to large applied stresses, in which strain gauges often deform by greater than approximately 2% elongation. Strain gauges according to the present invention can be used in applications such as: parachute static lines, parachute canopy materials, and automotive and aircraft seatbelts. When a strain gauge element is woven into a web in one of the above applications, the element can elongate by up to approximately 8% and measure elongations in the web of up to approximately 30%, with any elongation beyond approximately 20% generally not being recoverable by the web. Conventional strain gauges made of typical metals and metal alloys fail when the metal material(s) reach approximately 0.1–1% elongation. Thus, it is not possible to measure moderate to high strain amounts using these typical materials. It has now been discovered that strain in materials that experience straining or stretching by greater than about 1%, and more preferably greater than about 2%, in response to applied stresses can be monitored using strain gauges comprising a pseudoelastic material that exhibits recoverable strain greater than about 1%, and preferably greater than about 2%.

A strain gauge including an element, such as a filament or wire, made of a shape memory alloy and/or a pseudoelastic alloy material such as Nitinol exhibits a change of resistance when it is strained, similar to conventional strain gauges. Thus, conventional strain gauge signal conditioning techniques can be used to measure strain in accordance with the device and method of the present invention.

As used herein, the terms "shape memory alloy" and "pseudoelastic alloy" refer to a material having (i) an austenite to martensite solid-to-solid phase transition, and (ii) an ability for the martensite structure to be deformed by twin boundary motion. The preferred materials to be used in the present invention are pseudoelastic alloys, which are further defined as materials that undergo the martensite to austenite phase transition without a significant change in temperature. In pseudoelastic alloys, the martensite to austenite transition occurs due to the dynamically applied stress forces which overcome the natural driving force that keeps the material at equilibrium in the austenite phase.

BRIEF DESCRIPTION OF THE DRAWINGS

For a fuller understanding of the nature of the present invention, reference is made to the following detailed description taken in conjunction with the accompanying drawing figures wherein like reference characters denote corresponding parts throughout the several views and wherein.

DETAILED DESCRIPTION OF THE INVENTION INCLUDING THE PREFERRED EMBODIMENT(S)

A device and method for measuring strain in objects using a strain gauge made of a shape memory alloy material, and preferably a pseudoelastic alloy material, is disclosed. A preferred pseudoelastic alloy is Nitinol, which when provided in pseudoelastic form can strain up to approximately 8% of its length without experiencing permanent deformation. A length of pseudoelastic material providing an electrical conduit or pathway can be used in a strain gauge which is mounted on a substrate and attached to an object to measure strain in the object. Other preferred types of strain gauges comprise pseudoelastic wires, preferably Nitinol wires, which are stitched or woven into a web of material (such as a fabric) to measure strain in the web. When stitched, the strain gauge comprising a pseudoelastic wire can measure strains in the web of up to approximately 8%. When woven into a fabric, strains of up to approximately 20% can be measured in the fabric.

Figure 1:
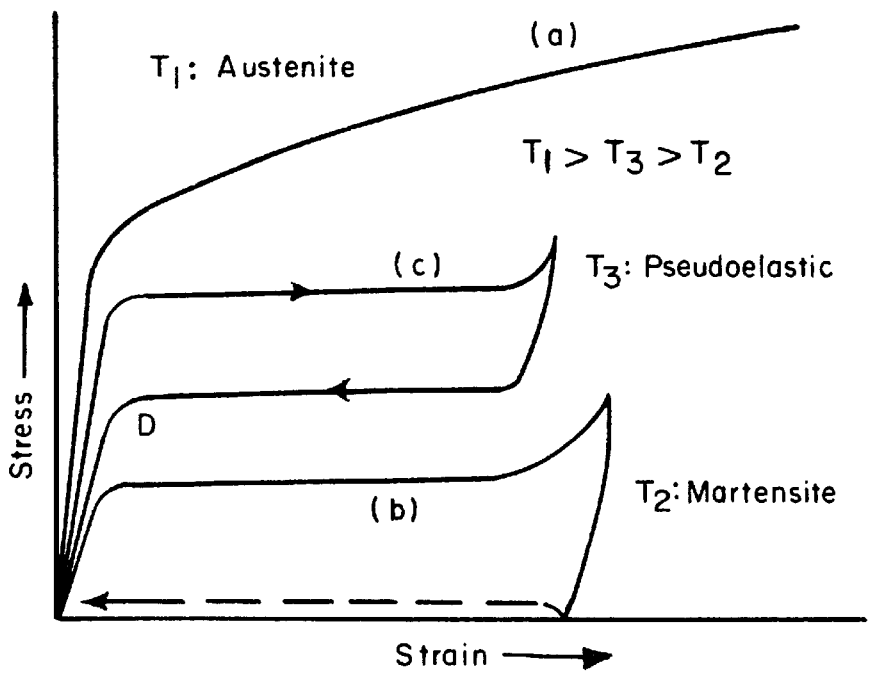
FIG. 1 is a graph illustrating stress-strain curves for shape memory alloy materials in the austenite and martensite phases, including a curve corresponding to the pseudoelastic form present in certain materials.
Figure 2:
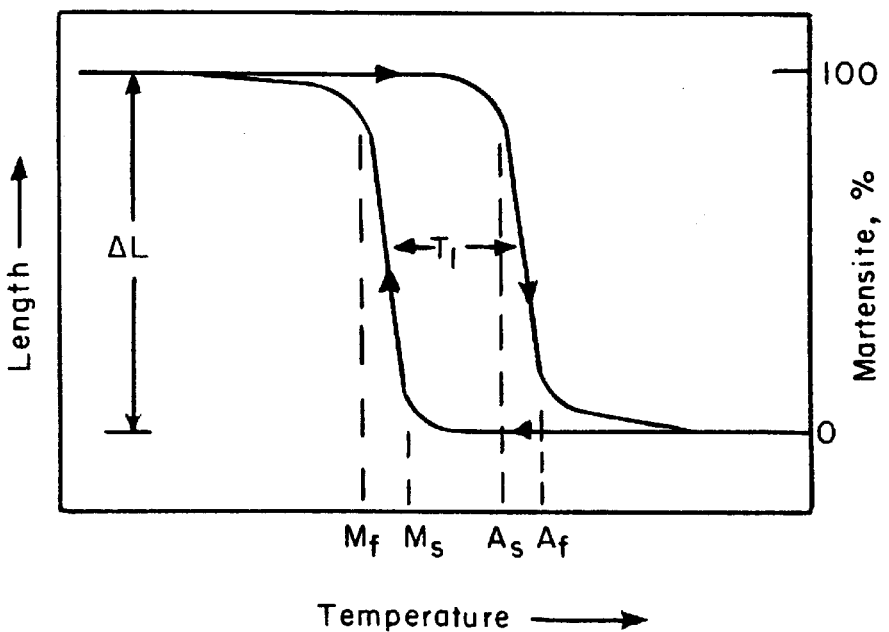
FIG. 2 is a graph with length plotted versus temperature for a shape memory alloy useful in the present invention.

FIG. 1 illustrates typical stress-strain curves for shape memory alloy materials in a test set-up (e.g. a wire made of a shape memory alloy). For illustration purposes, curves for pseudoelastic and martensite phases are included (where only one of the pseudoelastic and marten site phases is present for a given material). For a material with an austenite phase present at $T_1$, and a martensite phase at $T_2$, the material can be strained by approximately 3%–8% of its length under low applied stresses. If the temperature of the alloy material is raised above its transition temperature, the material changes to its austenite phase and recovers to its original, undeformed shape. This transformation is shown in FIG. 2, in which $A_s$ and $A_f$ represent start and finish points of the austenite phase, respectively; and $M_s$ and $M_f$ represent start and finish points of the martensite phase, respectively.

According to FIG. 2, for a shape memory alloy material at equilibrium in the austenite phase, when a dynamic stress is applied, the material is converted from austenite to martensite as the temperature drops below $M_s$, while the length of the SMA wire increases until the temperature reaches the $M_f$ temperature. As indicated by arrows, the transition from the austenite to the martensite phases is reversible. By heating the SMA material, its length decreases between $A_s$ and $A_f$ until the material recovers to its original pre-stressed length.

Figure 3:
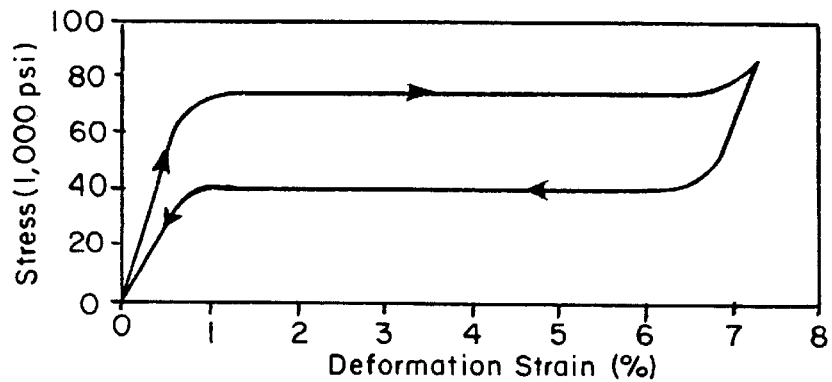
FIG. 3 is a graph of a stress-strain curve for a pseudoelastic alloy useful in the present invention.

FIG. 3 illustrates the property of pseudoelasticity, which is present in certain SMAs. For a pseudoelastic alloy material, the pseudoelastic phase is a type of martensite phase in which deformation can occur. As seen in FIG. 3, the material can reversibly strain by up to approximately 8%. As with non-pseudoelastic materials, the pseudoelastic alloy follows a different return path to the austenite phase, indicating that the material absorbs energy during the transformation.

Figure 4:
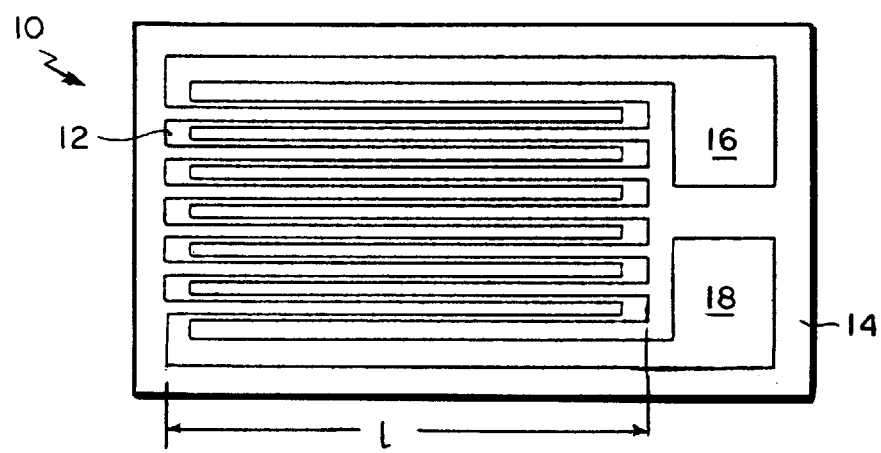
FIG. 4 is a schematic depiction of a strain gauge made of a pseudoelastic alloy material mounted on a Kraton substrate, according to the present invention.

FIG. 4 depicts a strain gauge 10 including a metal trace or filament 12 made of a pseudoelastic alloy mounted on a substrate 14. Pseudoelastic alloys experience a change of resistance under strain, and thus standard strain gauge signal conditioning techniques can be used in the strain gauge 10 to measure strains experienced by objects, according to the present invention. The strain gauge 10 can be mounted on a plate, for example, or various other objects as is known in the art. Such objects include high-strain materials, i.e. materials which can experience large strains in response to applied stresses. High-strain materials include rubber sheets, rubber diaphragms, rubber straps, balloons, and plastics.

As shown in FIG. 4, the filament 12 preferably is made of Nitinol and includes a plurality of turns extending between first and second leads 16 and 18, each of the turns having approximately a length "l" where the total filament length L=14(l). The strain gauge can be mounted on an object to measure strain experienced by the object. A current is placed through the filament, and the resistance of the filament changes as the object elongates (i.e. undergoes strain) in response to an applied stress. The change of resistance of the filament is directly proportional to the change of length of each turn l, where a plurality of turns preferably are included in the strain gauge (the strain gauge of FIG. 4 has 14 turns) in order to dissipate heat produced by the current. Strain experienced by the object can be determined by measuring the resistance change of the filament at the leads 16 and 18. A wheatstone bridge or other conventional electric circuit can be used to obtain resistance measurements. Strains of up to approximately 8% can be measured using the strain gauge with Nitinol filament 12 as depicted in FIG. 4.

Figure 5:
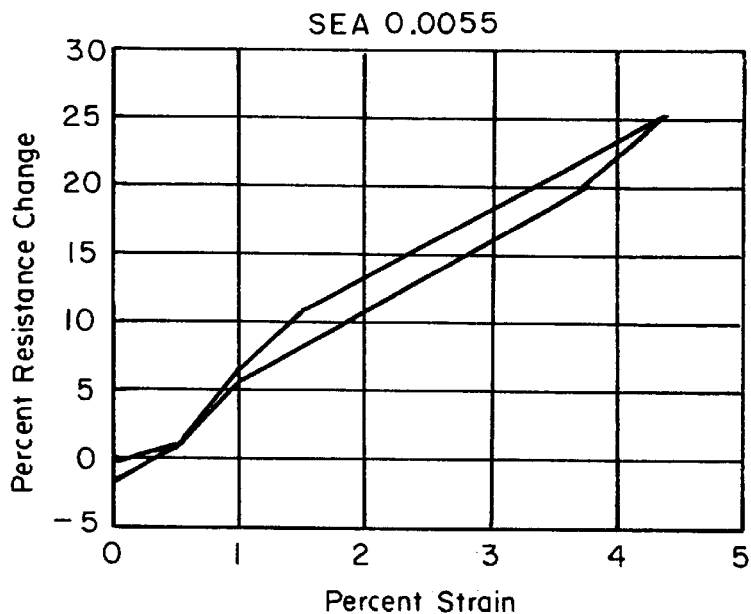
FIG. 5 is a graph of the percent resistance change versus percent strain for a Nitinol wire 55 cm long used in a strain gauge.

Because pseudoelastic alloys and shape memory alloys exhibit measurable changes of resistance when strained, such alloys are suitable for use in strain gauges/sensors. FIG. 5 depicts the resistance change of a Nitinol wire in a test set-up. A pseudoelastic Nitinol wire 55 cm long and 1 mm in diameter was clamped at either end, and stresses were applied which produced the strain levels indicated on the graph. A change of resistance was measured using conventional strain measurement techniques, e.g. by subjecting the wire to a current. As indicated in FIG. 5, the Nitinol wire in pseudoelastic form reversibly elongated by approximately 5% without permanent deformation of the wire. Such a wire can be used in the strain gauges of the present invention.

Figure 6:
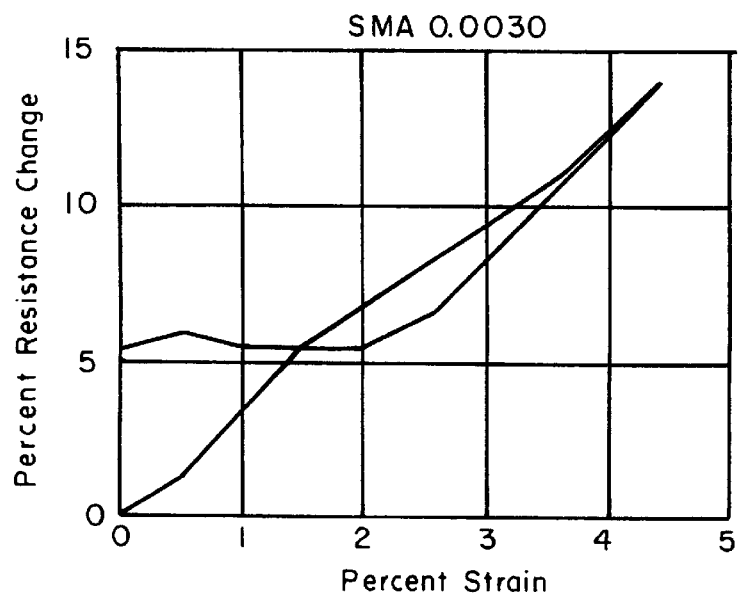
FIG. 6 is a graph of the percent resistance change versus percent strain for a 30 cm wire made of a shape memory alloy used in a strain gauge.

By contrast, FIG. 6 illustrates the resistance change of a non-pseudoelastic shape memory alloy material, in a test set-up similar to that described with reference to FIG. 5. To produce the graph of FIG. 6, a shape memory Nitinol wire 30 cm long and 1 mm in diameter in the martensite state was tested. The Nitinol wire experienced a change of resistance upon stretching, with a resistance change somewhat less than the pseudoelastic alloy. When strained to a similar threshold as the pseudoelastic wire of FIG. 5, approximately 1.5% of strain was plastic deformation, and could not be recovered without heating the wire. Thus, while non-pseudoelastic shape memory alloys can be used in strain gauges according to the present invention, they must be heated in order to recover any plastic deformation if reuse is desired. Alternatively, such materials can be designed for single use applications such as cargo loading systems in which a load is tested to determine whether any load shifting is acceptable. Generally, pseudoelastic alloys are preferred for reuse applications because they permit maximum strain recovery without plastic deformation.

A strain gauge incorporating a pseudoelastic alloy material functions in a manner similar to conventional strain gauges, except that it is capable not only of measuring small strains in an object, but also medium to large size strains because of the use of a pseudoelastic alloy material. Conventional strain gauges made of typical metals and metal alloys fail upon straining with approximately 0.1–1% elongation, whereas the present invention is directed to strain gauges made of pseudoelastic materials capable of withstanding approximately 8% elongation without permanent deformation. Strain gauges according to the present invention are particularly useful for measuring strains when a length of pseudoelastic alloy is woven into a fabric, where the strains in the fabric can reach approximately 20% elongation. When used with such fabrics, strain gauges made of pseudoelastic materials are often subject to strains greater than the yield point of conventional strain gauges, with applied stresses producing greater than about 1% elongation. Examples of these fabrics include: parachute static lines, parachute canopy materials, and automotive and aircraft seatbelts. By using a strain gauge made of a pseudoelastic material according to the present invention, the full amount of strain in the fabric can be measured by the strain gauge.

A preferred pseudoelastic alloy material for use in a strain gauge is Nitinol, which is a mixture of two component metals, nickel (Ni) and titanium (Ti) in approximately equal parts. Illustrated in Table 1 below are properties of Nitinol, where it can be seen that Nitinol can deform by up to approximately 8% (values provided for Nitinol in a test set-up).

TABLE 1

Characteristic Properties of Nitinol

| TYPE | PROPERTY | WIRE DIAMETER | | |
|---|---|---|---|---|
| | | 50 μm | 150 μm | 250 μm |
| Physical | Minimum Bend Radius (mm) | 2.5 | 7.5 | 12.5 |
| | Cross-Sectional Area (μm$^2$) | 1,960 | 17,700 | 49,100 |
| Electrical | Recommended Current (mA) | 50 | 400 | 1,000 |
| | Recommended Power (W/m) | 1.28 | 8.00 | 12.00 |
| Strength | Max. Recovery Force @600 MPa (N) | 1.15 | 10.35 | 28.74 |
| | Rec. Recovery Force @190 MPa (N) | 0.34 | 3.32 | 9.11 |
| Speed | Max. Contraction Speed (sec) | 0.1 | 0.1 | 0.1 |
| | Relaxation Speed | 0.3 | 2 | 5.5 |
| | Typical Cycle Rate (cyc/min) | 46 | 20 | 9 |
| Thermal & Mechanical | Heat Capacity (cal/g°C.) | | 0.077 | |
| | Density (g/cc) | | 6.45 | |
| | Maximum Deformation Ratio (%) | | 8 | |
| | Recommended Deformation (%) | | 3–5 | |
| | | Low Temp | | High Temp |
| | Resistivity (μΩcm) | 76 | | 82 |
| | Young's Modulus (GPa) | 28 | | 75 |
| | Thermal Conductivity (W/cm°C.) | 0.08 | | 0.18 |

The preferred material for the filament or wire of the strain gauge is a Nitinol alloy. However, other pseudoelastic alloys and shape memory alloys can be used, including but not limited to mixtures of: nickel and aluminum (Ni—Al), copper and zinc and another element Cu—Zn—X (where the other element X can be silicon (Si), tin (Sn), or aluminum (Al)), copper and zinc (Cu—Zn), copper and tin (Cu—Sn), copper and aluminum and nickel (Cu—Al—Ni), iron and platinum (Fe—Pt), iron and manganese and silicon (Fe—Mn—Si), or manganese and copper (Mn—Cu).

A strain gauge, e.g. that shown in FIG. 4, can be constructed in which the filament 12 is mounted on a substrate 14, which is preferably a material capable of elongating at least as much as the filament 12, in order to accommodate strain in an object. Many polymers and plastics stretch to a greater extent than Nitinol or other pseudoelastic alloys. Preferred substrate materials for higher temperature applications (such as aerospace structural applications) include polyetherether ketone (PEEK), polyphenylene sulfide (PPS), and polyether imide (PEI). Preferred substrate materials for lower temperature applications (in which lower viscosity, high elongation materials are desirable) include Grilamid elastomers (nylon 12 or transparent nylon) and Kraton compounds. Properties of these materials are listed in Table 2 below. Other materials that can be used for the substrate 14 include: thermoplastic polyester, polycarbonates, polyamide-imide, polyarylsulfone, polyether sulfone, and styrene-rubber elastomers.

TABLE 2

Thermoplastic Substrate Materials

| Property | High Temperature | | | Low Temperature | |
| --- | --- | --- | --- | --- | --- |
| | PEEK | PEI | PPS | Grilamid | Kraton |
| Tensile Strength (MPa) | 120 | 98 | 70 | 42 | 32 |
| Elongation (%) | 50–190 | 15–60 | 3–6 | 275 | 880 |
| Tensile Modulus (GPa) | 2.7 | 3.3 | — | 0.2 | 0.002 |
| Flexural Modulus (GPa) | 3.7 | 3.3 | 4.0 | — | — |
| Processing Temperature (° C.) | 390 | 335 | 327 | <250 | <250 |
| Melt Viscosity | Moderate | High | Moderate | Low | Low |

Strain gauges incorporating shape memory alloys and pseudoelastic alloys are useful in conjunction with many different fabrics and systems. For example, such strain gauges can be used in automotive seat belts, where the seat belt fabric often stretches in response to wearer movements, for example, caused by sudden stops in a car. Because the strains experienced in seat belts are so large, if conventional strain gauges were used, the strain gauges would elongate beyond their elastic limit, resulting in premature failure.

A strain gauge as taught by the present invention includes a wire that is preferably woven into a seat belt in order to accurately measure the large strains present in the seat belt. In other words, the pseudoelastic wire or filament is woven into the fabric or embedded into the fabric/material. By incorporating a strain gauge having a Nitinol or other pseudoelastic wire according to the present invention, the measured strain in the seat belt can be correlated with applied loads via the stress-strain relationship of the material. Thus, a decision can be made automatically as to whether or not to deploy a safety device such as an air bag.

Figure 7:
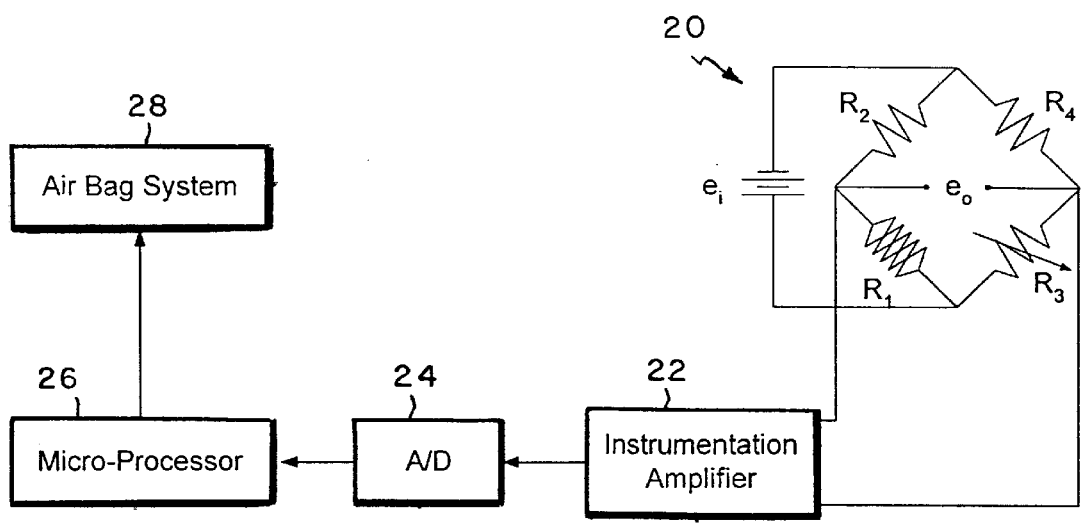
FIG. 7 is a schematic depiction of an arrangement for measuring strain in a seat belt used to automatically deploy an air bag system.

A schematic arrangement for measuring strain using a Nitinol pseudoelastic wire woven into a seat belt is shown in FIG. 7. A wheatstone bridge circuit 20 preferably is used, where $R_1$ represents the Nitinol wire and $R_3$ is a balancing potentiometer used to make the voltage $e_o$ equal zero. $R_2$ and $R_4$ are fixed resistors needed to complete the wheatstone bridge. As shown in FIG. 7, the output of the wheatstone bridge, which is proportional to the strain measured by the Nitinol strain gauge/sensor, is amplified using an instrumentation amplifier 22. The amplified signal is then converted to a digital signal using an analog-to-digital (A/D) converter. The digital signal is monitored with a microprocessor 26. When a threshold strain value is exceeded, the microprocessor 26 sends a command to the automobile's air bag system to deploy the air bag. Since smaller occupants, such as children, tend to stretch the seat belt by a lesser amount than adults, the strain gauge herein described can protect infants and children from unnecessary and unsafe air bag deployments.

The system of FIG. 7 can be used to monitor cargo loads held down by webbing instrumented with Nitinol strain gauges according to the present invention. During operation, if the cargo shifts beyond a threshold amount, the microprocessor can warn the operator to take corrective action.

Figure 8:
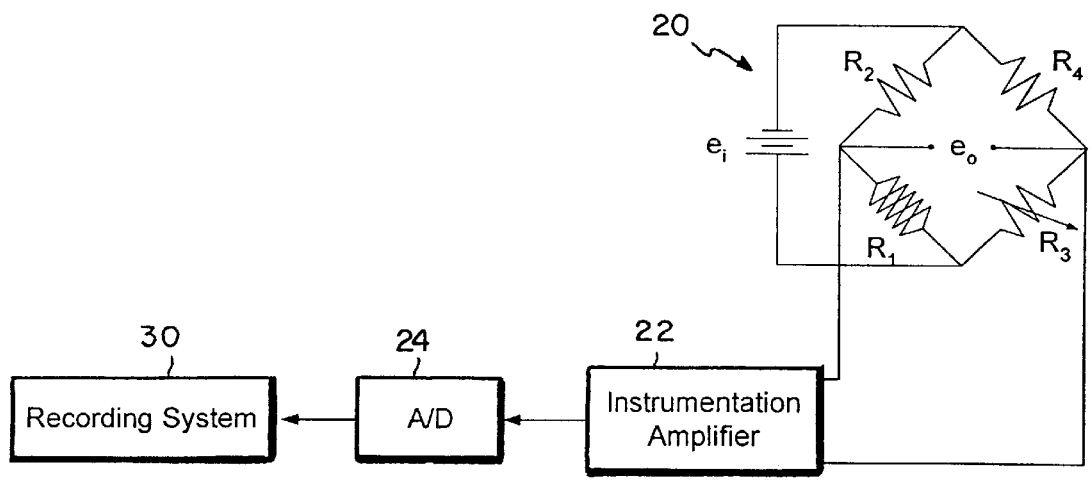
FIG. 8 is a schematic depiction of an arrangement for measuring strain and recording lung expansion in patients.

FIG. 8 illustrates a schematic arrangement for measuring dynamic strains in people. For example, a strap with a strain gauge comprising Nitinol wire woven into the strap material can be wrapped around the torso of a person. Strain is measured in the manner described above with reference to FIG. 7. The strain measured is proportional to the expansion of the person's lungs. A recording system 30 can be used to monitor and record lung expansion, thus providing an arrangement for monitoring critically ill patients.

Another application in which strain gauges of the present invention can be used is fabric parachutes. One or more strain gauges with Nitinol or another pseudoelastic alloy material can be stitched into the parachute fabric to measure dynamic strains during deployment of the parachute, as well as the dynamic deformation of the fabric under load. Such information can provide useful data to validate various deployment models. Conventional strain gauges are unable to measure strain levels in a parachute, because the strains experienced in a parachute are beyond the elastic limit of conventional strain gauges.

Figure 9A:
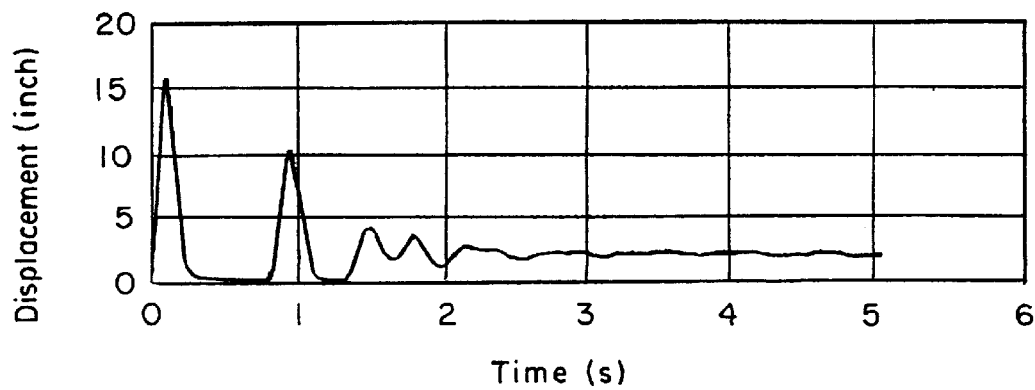
FIG. 9A is a graph of the displacement of a static parachute line with a 240-pound weight attached at the end thereof during a drop test, as measured by a strain gauge incorporating a Nitinol wire which is stitched into the fabric of the parachute.
Figure 9B:
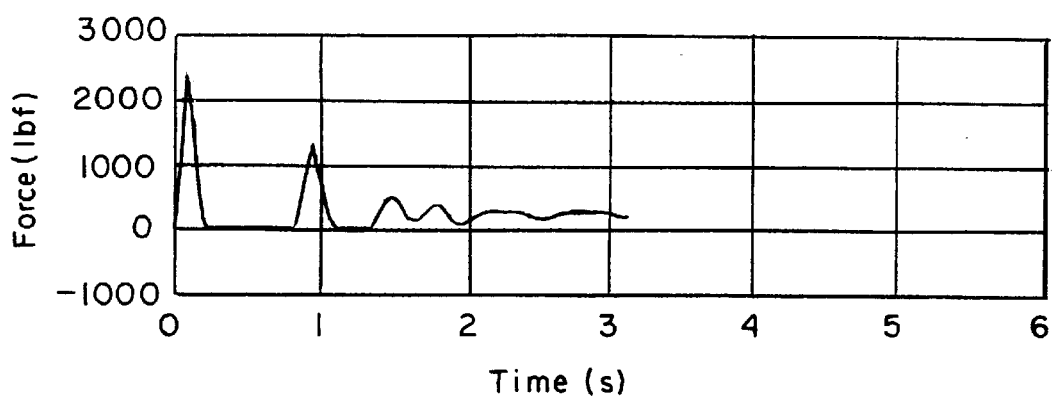
FIG. 9B is a graph of the applied force over time as measured by a load cell in the drop test described with reference to FIG. 9A.
Figure 10:
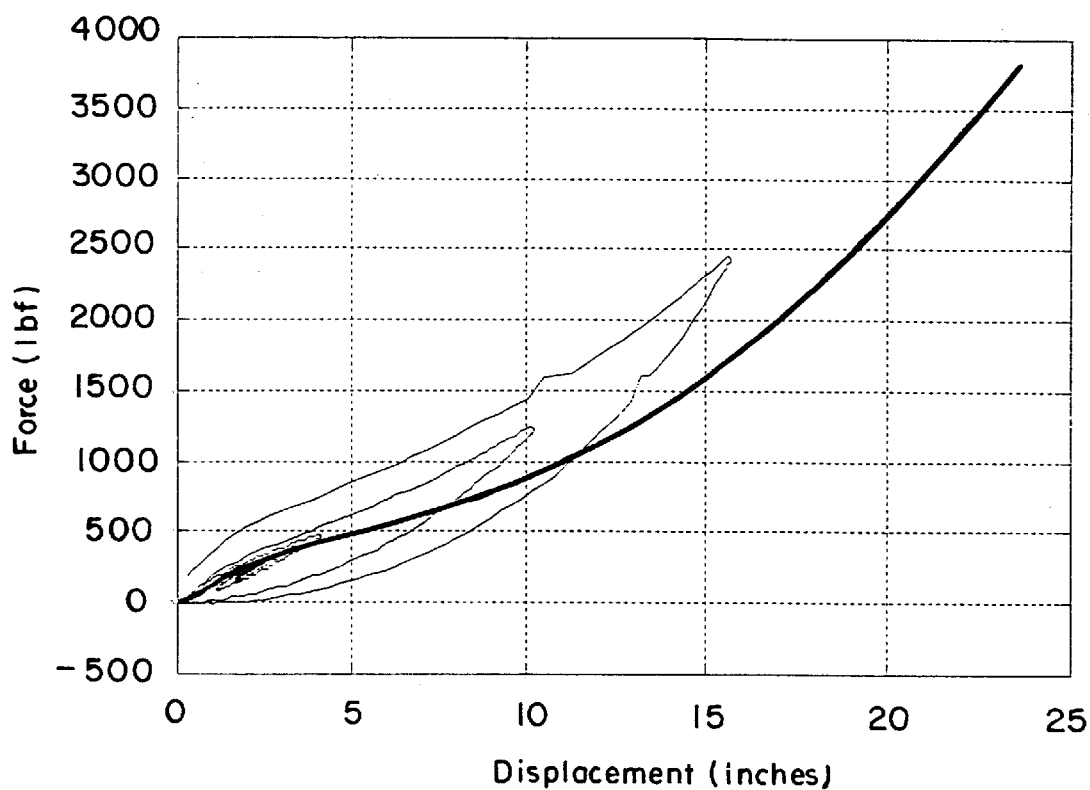
FIG. 10 is a graph of the force measured by the load cell versus displacement using the data from the drop test as displayed in FIGS. 9A and 9B (see lighter lines), and the static load-deflection curve of the static line material (see darker line).

As one example of the use of strain gauges of the present invention in parachutes, tests were conducted in which a strain gauge having a pseudoelastic Nitinol wire was woven into a parachute static line. The parachute static line, made of ABSORBEDGE material, had a 240-pound weight attached at one end. The weight was dropped a distance of five feet, and the corresponding elongation of the static line was measured. Simultaneously, a load cell was used to measure the force of the dropped weight. As seen by comparing FIG. 9A with FIG. 9B, the results measured in the strain gauge mirrored those produced by the load cell. FIG. 10 is a plot of the force measured by the load cell versus the displacement measured by the pseudoelastic Nitinol wire, using the data displayed in FIGS. 9A and 9B, showing that the force of the falling weight is proportional to the measured elongation of the static line (see lighter lines). Also shown (see darker line) is the static load-deflection curve of the ABSORBEDGE material. Results of the drop test indicate that the strain gauge accurately measured the displacement of the static line, and thus is a good indicator of elongation, and hence strain. In the ABSORBEDGE material, the Nitinol wire measured elongation of approximately 15–18% without plastic deformation.

As indicated by the examples above, a shape memory alloy wire woven into a fabric becomes a large strain sensor or gauge since by measuring the change of resistance of the wire when the fabric is deformed, the strain of the fabric can be determined. Useful applications include the use of strain gauges in cargo webbing, where integral Nitinol strain gauges/sensors can monitor the positioning of cargo loads, and thus warn operators of cargo shifts and dynamic stresses which cause dangerous loading conditions; and the measurement of body plethysmography (i.e. lung capacity), where an elastic material with a strain gauge made of Nitinol embedded therein can be stretched around the body in order to measure chest expansion.

Although the invention has been described in detail including the preferred embodiments thereof, such description is for illustrative purposes only, and it is to be understood that changes and variations including improvements may be made by those skilled in the art without departing from the spirit or scope of the following claims. For example, the wire or filament of the strain gauge can be embedded in non-woven fabrics or fibers of materials, the pseudoelastic material can be coated in a continuous path, or a pseudoelastic yarn can be woven into a material, etc.

What is claimed is:

1. A device for measuring elongation of an object, the device comprising:

a substrate attached to the object; and a length of shape memory alloy mounted on the substrate, the alloy reversibly elongating to accommodate an applied stress while exhibiting a change of resistance, wherein elongation of the object is determined by measuring the change of resistance of the length of shape memory alloy.

2. The device of claim 1, wherein the shape memory alloy is a pseudoelastic allay.

3. The device of claim 2, wherein the device elongates by up to approximately 8% to accommodate the elongation of the object.

4. The device of claim 1, wherein the length of shape memory alloy is a Nitinol wire.

5. A device for measuring elongation of a web of material, the device comprising:

a length of shape memory alloy attached to the web of material, the alloy reversibly elongating to accommodate an applied stress while exhibiting a change of resistance, wherein elongation of the web of material is determined by measuring the change of resistance of the length of shape memory alloy.

6. The device of claim 5, wherein the device elongates by up to approximately 8% to accommodate the elongation of the web of material.

7. The device of claim 6, wherein the web of material is selected from the group consisting of; a rubber sheet, a rubber diaphragm, a rubber strap, a balloon, and a plastic.

8. The device of claim 7, wherein the length of shape memory alloy is embedded into the web of material.

9. The device of claim 5, wherein the device is stitched to the web of material.

10. The device of claim 5, wherein the device is woven into the web of material.

11. The device of claim 5, wherein the device measures elongation of up to approximately 20% in the web of material.

12. The device of claim 5, wherein the web of material is a scat belt.

13. The device of claim 5, wherein the web of material is a parachute.

14. The device of claim 5, wherein the length of shape memory alloy is a Nitinol wire.

15. A device for measuring elongation of a web which elongates in response to an applied stress, the device comprising:

an elongated element of a shape memory alloy embedded into the web, wherein the element reversibly elongates to accommodate the applied stress and exhibits a change of resistance, and elongation of the web is determined by measuring the change of resistance of the element.

16. The device of claim 15, wherein the shape memory alloy element elongates by up to approximately 8% to accommodate the applied stress.

17. The device of claim 15, wherein the shape memory alloy element is made of a pseudoelastic alloy.

18. The device of claim 15, wherein the shape memory alloy element is made of Nitinol.

19. The device of claim 15, wherein the strain gauge measures the strain of up to approximately 20% in the web.

20. The device of claim 15, wherein the web is a seat belt.

21. The device of claim 15, wherein the web is a parachute.

22. A method for measuring strain, comprising the steps of:

providing a web of material;

providing a strain gauge including an elongated element of a shape memory alloy attached to the web of material;

subjecting the web of material to an applied stress such that the web elongates to accommodate the applied stress;

applying a current through the element of the shape memory alloy; and measuring a change of resistance of the element to determine strain in the web of material caused by the applied stress.

23. The method of claim 22, wherein the shape memory alloy element is a pseudoelastic alloy.

24. The method of claim 23, wherein the strain gauge element elongates by up to approximately 8% to accommodate the elongation of the web of material.

25. The method of claim 23, wherein the strain gauge is mounted on an object.

26. The method of claim 25, wherein the strain gauge includes a substrate, and the shape memory alloy element is mounted on the substrate.

27. The method of claim 24, wherein the element is woven into the web of material.

28. The method of claim 24, wherein the element is stitched to the web of material.

29. The method of claim 22, wherein the web of material is a seat belt.

30. The method of claim 22, wherein the web of material is a parachute.

* * * * *